United States Patent [19]

Lindblad

[11] 4,009,510
[45] Mar. 1, 1977

[54] DEFLECTION DEVICE FOR SAFETY BELTS

[76] Inventor: Oskar Lennart Lindblad, Hedasgatan 16, 440 20 Vargarda, Sweden

[22] Filed: Jan. 8, 1976

[21] Appl. No.: 647,518

[30] Foreign Application Priority Data
Jan. 10, 1975 Sweden .............................. 7500247

[52] U.S. Cl. .................................. 24/196; 297/389
[51] Int. Cl.² ......................................... A44B 11/10
[58] Field of Search ......................... 297/388, 389; 280/744–747; 24/163 R, 170, 193, 196

[56] References Cited
UNITED STATES PATENTS

| | | | |
|---|---|---|---|
| 3,420,573 | 1/1969 | Holmberg | 297/389 |
| 3,551,961 | 1/1971 | Nygren | 24/196 |
| 3,719,972 | 3/1973 | Klink | 24/193 |
| 3,847,434 | 11/1974 | Weman | 297/389 |
| 3,898,715 | 8/1975 | Balder | 24/196 |
| 3,927,912 | 12/1975 | Takada | 297/388 |

FOREIGN PATENTS OR APPLICATIONS
305,138 10/1968 Sweden .............................. 280/744

*Primary Examiner*—Paul R. Gilliam
*Assistant Examiner*—R. Moore

[57] ABSTRACT

Deflection device for a safety belt with a bar around which the safety belt passes, a pivotable arm in which the bar can slide in a direction transverse to the longitudinal extension of the belt and a stop for the bar, the arrangement being such that the belt can normally pass freely around the bar from the belt collector but that the belt becomes clamped between the bar and the stop when subjected to abnormal forces, such as a collision or extreme deceleration.

9 Claims, 3 Drawing Figures

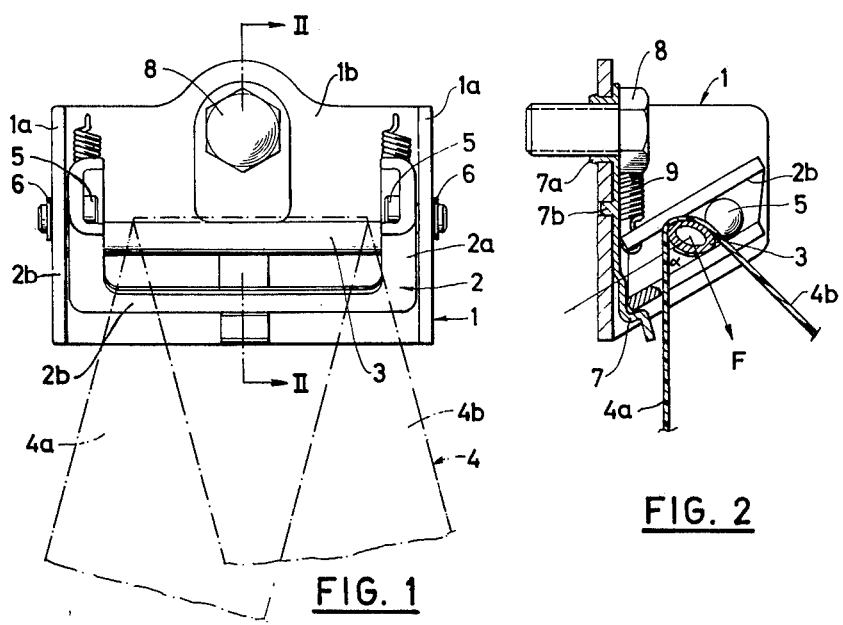
FIG. 1
FIG. 2
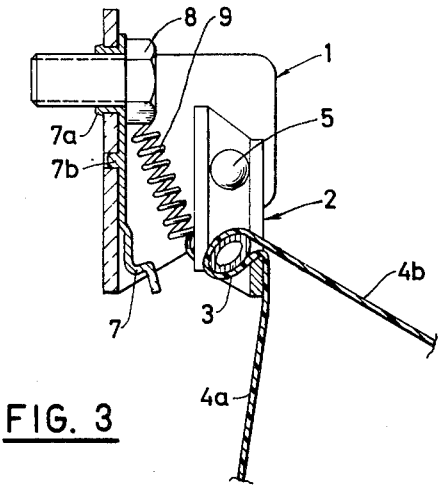
FIG. 3

DEFLECTION DEVICE FOR SAFETY BELTS

The present invention relates to a deflection device for safety belts comprising band- or wire collecting means and over which device said band etc. in the condition of use is intended to be carried in a running arrangement.

Band- or wire collecting means of the prior art as a rule also exhibit means for locking of the band on one hand in connection with a rapid drawing out of the same and on the other hand in connection with abnormal changes of speed of the vehicle in one direction or other. Due to the fact that these means can be subjected to very great stresses, they must be comparatively strongly dimensioned and be made of very high strength material, while at the same time it is a desirable feature to keep the dimensions of the collecting means, which often comprise reels, as small as possible, above all on account of the space in which such a collecting means is intended to be mounted often being very limited.

It is a principal object of the invention to provide a device, which in a high degree reduces the manufacturing cost of the collecting means, at the same time as the locking of the band is made more effective, while the locking mechanism existing in connection with the collecting means can be made considerably simpler and cheaper to manufacture.

This object is reached by providing the safety belt assembly with a deflection device according to the invention, which substantially is characterized by comprising a device for the locking of the band, when it is subjected to an abnormal pull or when the vehicle is subjected to abnormal changes of speed. By incorporating a locking function into the deflection device, the locking mechanism forming part of the collecting means assembly, is relieved from stress, it only being operative for initiating an effective locking of the band in the deflection device.

In the following an example of an embodiment of the invention will be described, reference being made to the accompanying drawing, in which FIG. 1 is a view of a deflection bracket preferably mounted on the top portion of the door post of the vehicle in question, the device seen in the direction towards said door post, not shown, from the interior of the vehicle, FIG. 2 is a cross sectional view along the line II — II of FIG. 1, the locking device being in inactive condition, and FIG. 3 is a cross sectional view corresponding to FIG. 2 through the deflection device in its locking position.

The deflection device illustrated in the drawing comprises a frame made of a metal sheet 1 bent in U-shape, an arm 2 pivotably mounted in the sides of the frame 1, and a bar 3 supported by the arm, around which bar the band 4 of the safety belt is laid. The arm 2 has a U-profile and is bent in U-shape, its legs 2a being pivotably journaled each one in its endwall 1a of the frame by means of pivots 5 extending through the legs and endwalls respectively and being locked by means of locking washers 6 located on the outside of the endwalls. The deflection bar 3 extends between the two legs 2a, the end portions of said bar being displaceably guided in grooves 2b, which are formed by the legs 2a and are open towards each other, the heads of the pivots 5 located in the grooves forming stops for the bar 3 preventing the same from being displaced out of the groove. The band part 4a starting from a collecting means, not shown, extends in upwards direction between the transverse portion 2b of the arm and the bar 3, the band thereafter being laid around the bar 3 and passing into a portion 4b of the same, which is intended to extend diagonally across the chest of the person using the safety belt. The arm 2 is normally kept in the pivoting position, illustrated in the FIGS. 1 and 2, by means of a locking spring 7, which grips around the intermediate portion 2b of the arm, and which is attached to the frame 1 by means of a bolt 8 designed to hold the frame to the body of the vehicle, preferably to its door post. The locking spring 7 has a sleeve shaped portion 7a, which is thread through the intermediate portion 1b of the frame, and through which in its turn the bolt 8 is drawn. In order to prevent the spring 7 from pivoting sideways around the bolt 8, the spring is provided with a projecting part 7b, which extends into a fixation bore in the frame portion 1b. A tension spring 9 extends between the frame portion 1b and the end of the arm facing away from the pivot 5, said spring 9 constantly tending to bring the arm to the pivoting position illustrated in FIGS. 1 and 2. As is best evident from FIGS. 2 and 3, the two band portions 4a and 4b emerge on the same side of the arm 2, the resultant force F brought about by the collecting means, common to the two band parts, in the pivoting position illustrated in FIG. 2 forming one leg of an angle α, which does not fall considerably below 90 degrees, the other leg of said angle extending along the arm in direction towards the stop, its apex substantially coinciding with the bar. In this position the device serves the purpose of a conventional deflection bracket, i.e. the band 4 can slide comparatively free over the bar 3, which suitably may have the oval cross section illustrated in the drawing, its width exceeding the width of the guiding groove 2b. It is of course also within the scope of the invention to give the bar a different cross section.

The locking force of the spring 7 and the position of the tension spring 9 are adjusted in such a manner that the collecting force acting upon the band cannot pivot the arm of the position shown in FIG. 2. However, in case the band part 4b should be subjected to an abnormal pull at the same time as the band part 4a is braked, the arm 2 against the action of the snap lock 7 and the tension spring 9 will be pivoted to the position illustrated in FIG. 3, the bar 3 thereby sliding in a direction towards the end of the arm forming the stop, whereby the band part 4a is clamped between the bar and the stop as a result of the pulling force acting upon the band. This means that the greater part of the force in question is taken up by the deflection device, which brings about that the locking devices of the collecting means are considerably relieved from stress. In the present case said locking devices only have the function of initiating the following locking action brought about by the deflection device. When said abnormal pulling force working upon the band part 4b ceases, the return spring 9 returns the arm 2 to the normal position illustrated in FIG. 2 past the locking portion of the spring 7.

The invention is not limited to the embodiment described above and illustrated in the drawings by way of example only, but can be varied with respect to its details within the scope of the following claims without therefore departing from the fundamental idea of the invention. Thus, it is within the scope of the invention to design the device only with the return spring 9 or alternatively with the locking spring 7, i.e. it is not necessary to use both of these as holding devices in combination. It is also possible to replace for example the locking spring with a preferably electrically operated magnetic lock.

I claim:

1. A deflection device for a safety belt arrangement including a belt and belt collecting means, comprising: a bracket to be connected to a part of a vehicle, a bar about which a belt is adapted to pass, a stop, said bar being movable in a direction towards and away from said stop, an arm pivotally supporting said stop about an axis transverse to the longitudinal extension of a belt passed around said bar, said bar being movable along said arm in said transverse direction, said bar and stop being arranged to permit the belt to run free about said bar when the belt is subjected to a force at least equivalent to the collecting force of said collecting means under normal conditions of use, and to lock the belt between said bar and said stop when the belt is subjected to abnormal forces.

2. A deflection device according to claim 1, wherein said stop is located on the side of the bar facing away from said axis.

3. A deflection device accordng to claim 1, wherein said arm is pivotable between a normal position, in which the resultant force exerted by a belt passed around said bar on said bar forms an angle of not substantially less than 90 degrees, with a line along said arm in a direction towards said stop, the apex of said angle substantially coinciding with said bar, and a locking position, in which the angle between the resultant force and said line is relatively acute.

4. A deflection device according to claim 1, comprising means holding said arm in said normal position until the resultant force exceeds the collecting force of the collecting means.

5. A deflection device according to claim 4, wherein said holding means comprises at least one snap lock for said arm.

6. A deflection device according to claim 4, wherein said holding means comprises a spring constantly urging said arm to pivot to its normal position.

7. A deflection device according to claim 4, wherein said holding means comprises a snap lock for said arm, and a spring constantly urging said arm to pivot to its normal position, the force of said spring exceeding the force required for causing said arm to be engaged by said snap lock when returning to said normal position.

8. A deflection device according to claim 1, wherein said arm forms a substantially U-shaped body with two legs, and an intermediate portion forming said stop.

9. A deflection device according to claim 8, wherein said legs of said arm each have a U-shaped cross section, end portions of said bar being slidably guided in said legs.

* * * * *